(12) United States Patent
Fukuchi et al.

(10) Patent No.: US 7,459,674 B2
(45) Date of Patent: Dec. 2, 2008

(54) OPTICAL TWEEZERS

(75) Inventors: Norihiro Fukuchi, Hamamatsu (JP);
Yasunori Igasaki, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 227 days.

(21) Appl. No.: 11/582,550

(22) Filed: Oct. 18, 2006

(65) Prior Publication Data
US 2007/0114371 A1    May 24, 2007

(30) Foreign Application Priority Data
Oct. 19, 2005   (JP)  ............................ P2005-304719

(51) Int. Cl.
  H01S 1/00   (2006.01)
  H01S 3/00   (2006.01)
  H05H 3/02   (2006.01)
(52) U.S. Cl. .................... 250/251; 250/306; 250/201.3;
355/67; 354/15; 354/614; 354/566; 354/434;
354/601; 354/1; 354/11; 354/16; 354/279;
354/290; 354/292; 235/454; 235/455; 702/19;
703/5
(58) Field of Classification Search ................. 250/251,
250/306, 201.3; 355/67; 354/15, 614, 566,
354/434, 601, 1, 11, 16, 22, 24, 279, 290,
354/292; 235/454, 455; 435/287.2; 702/19;
703/5
See application file for complete search history.

(56) References Cited
U.S. PATENT DOCUMENTS
3,744,871 A * 7/1973 Takeda et al. ................. 359/11

FOREIGN PATENT DOCUMENTS

| EP | 0540759 | * 12/1993 |
|---|---|---|
| JP | 2001-066519 | 3/2001 |
| JP | 2004-138906 | 5/2004 |
| WO | 03/036368 | 5/2003 |

OTHER PUBLICATIONS

Leach et al. "3D Manipulation of Particles Into Crystal Structures Using Holographic Optical Tweezers." OSA, vol. 12, No. 1, Optics Express, pp. 220-226, Jan. 2004.

* cited by examiner

Primary Examiner—Jack I. Berman
Assistant Examiner—Meenakshi S Sahu
(74) Attorney, Agent, or Firm—Drinker Biddle & Reath LLP

(57) ABSTRACT

The present invention relates to optical tweezers having a structure for realizing a great object-trapping force. The optical tweezers form an optical trap for trapping an object in, and in the vicinity of, each of plural trapping positions by converging output beams in each of the trapping positions. The optical tweezers comprise light emitting means for outputting a reading light, hologram generating means for generating an output hologram by arranging plural partial holograms two-dimensionally such that each partial hologram causes an output beam to converge in a corresponding trapping position, and a spatial light modulator for generating plural output beams, each of which has been phase-modulated in accordance with the output hologram, from the reading light which reaches the spatial light modulator. In particular, the hologram generating means arrange partial holograms belonging to a group which corresponds to one of the trapping positions such that the partial holograms are divided between two regions obtained by partitioning the output hologram in two, for example.

7 Claims, 9 Drawing Sheets

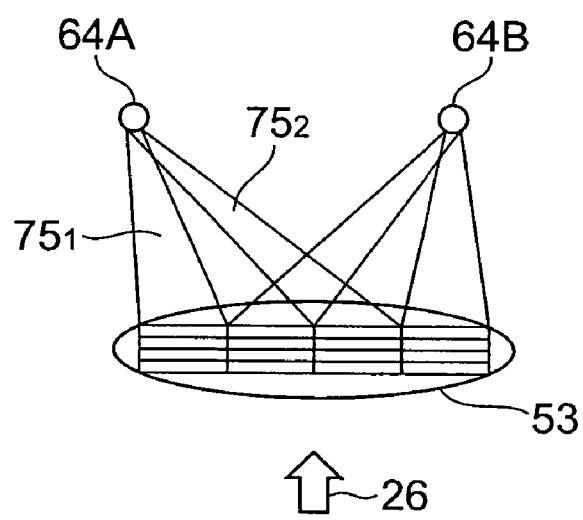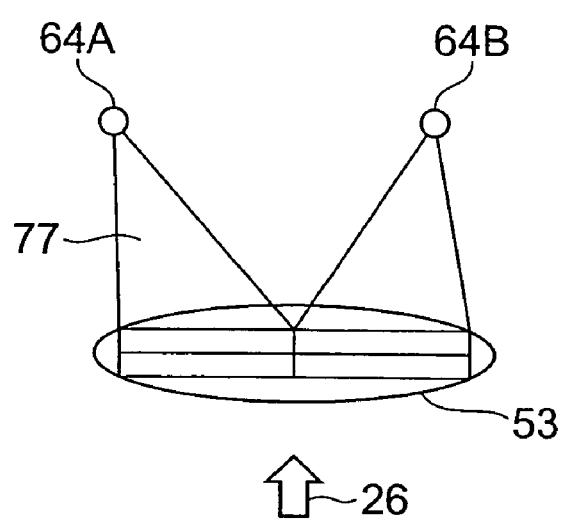
*Fig.6A*     *Fig.6B*

OPTICAL TWEEZERS

BACKGROUND OF THE INVENTION

1. Field of the Invention

The present invention relates to optical tweezers which trap one or more objects existing in the convergence position and the vicinity thereof, by forming an optical trap in an output beam convergence position.

2. Related Background Art

In known optical tweezers, a beam is converged in a predetermined position, and a minute object existing in a sample solution or the like, such as a cell, a chromosome, or a nanomachine, is trapped with no contact and no breakage using the optical force of the converged beam. The optical tweezers form an optical trap capable of trapping the minute object with the optical force of the converged beam in the convergence position of the beam and the vicinity thereof, and is capable of moving the object trapped in the optical trap to an arbitrary position within the sample solution by scanning the convergence position of an emitted laser beam, for example.

Japanese Unexamined Patent Application Publication 2004-138906 (Document 1) discloses optical tweezers in which a beam is converged in each of plural trapping positions so that an optical trap is formed in each trapping position using the optical force of the converged beam, and an object is trapped in each of the trapping positions. In these optical tweezers, the trapping positions are controlled by dividing a modulation surface of a spatial light modulator into plural regions corresponding to the respective trapping positions such that a phase pattern is formed independently in each divided region. In so doing, the plural objects trapped respectively in the plural trapping positions can be moved individually. When moving one of the trapped objects, only the phase pattern of the region corresponding to the object need be updated, and hence the objects can be moved rapidly.

In "3D manipulation of particles into crystal structures using holographic optical tweezers", Jonathan Leach et al., OPTICS EXPRESS, 2004 OSA (Optical Society of America), Jan. 12, 2004, pp. 220-226 (Document 2), a method of moving plural objects simultaneously and three-dimensionally using optical tweezers is described. However, Document 2 does not disclose the formation of independent phase patterns in each region of a modulation surface.

SUMMARY OF THE INVENTION

The present inventors have examined conventional optical tweezers, and as a result, have discovered the following problems.

That is, in order to trap an object in a predetermined trapping position using the optical force of a converged beam, not only the light quantity but also the numerical aperture (NA) of the converged beam which reaches the trapping position in which an optical trap is formed must be made sufficiently large. However, with the optical tweezers described in Document 1, the beam which is converged in the trapping position is emitted from a comparatively small surface area due to division of the modulation surface, and hence the numerical aperture tends to decrease.

The present invention has been developed to eliminate the problems described above. It is an object of the present invention to provide optical tweezers having a structure which is capable of increasing the numerical aperture of a beam converged in a trapping position in which an optical trap is formed, thereby realizing a great object-trapping force.

The present invention relates to optical tweezers which cause plural output beams to converge in each of plural corresponding trapping positions to form an optical trap for trapping an object in each of the plural trapping positions. The optical traps are formed in, and in the vicinity of, each trapping position by the optical force of the converged beam which reaches the trapping position. The optical tweezers according to the present invention comprise light emitting means, phase pattern generating means, and a spatial light modulator. The light emitting means output a reading light. The phase pattern generating means generate an output phase pattern by arranging plural partial phase patterns two-dimensionally after preparing the plural partial phase patterns divided into groups such that at least one of the partial phase patterns corresponds to each of the plural trapping positions, each partial phase pattern causing an output beam to converge in a corresponding trapping position. The spatial light modulator generates the plural output beams, each of which has been phase-modulated in accordance with the output phase pattern, from the reading light which reaches the spatial light modulator.

In particular, in the optical tweezers according to the present invention, the phase pattern generating means generate the output phase pattern by arranging the plural partial phase patterns two-dimensionally such that one partial phase pattern belonging to a group which corresponds to one of the plural trapping positions is apart from at least one of the other partial phase patterns belonging to the same group.

When the reading light enters the spatial light modulator, the plural output beams, which have been respectively phase-modulated by the plural partial phase patterns, are generated, and the plural output beams are converged respectively in each of the corresponding trapping positions. One of the partial phase patterns belonging to a group which corresponds to one of the plural trapping positions is apart from at least one of the other partial phase patterns belonging to the same group, and hence output beams are converged in a single trapping position from widely distributed positions. As a result of this constitution, the numerical aperture of the converged beam that reaches a single trapping position increases, and therefore the optical tweezers exhibit a powerful trapping force in each of the trapping positions.

In the output phase pattern generated by the phase pattern generating means, a partial phase pattern belonging to a group which corresponds to one of the plural trapping positions may be disposed between two separated partial phase patterns of the partial phase patterns belonging to a group which corresponds to another of the plural trapping positions.

When generating the output phase pattern, the partial phase patterns belonging to a group which corresponds to one of the plural trapping positions are preferably arranged irregularly. For example, the partial phase patterns may be arranged so as not to possess rotational symmetry of 180°/n (where n is an integer). By employing an irregular array in this manner, diffraction noise light is reduced in comparison with a case in which the partial phase patterns are arranged regularly.

By updating only the one or more partial phase patterns belonging to a group which corresponds to one of the plural trapping positions, the optical tweezers according to the present invention are capable of moving only the trapping position in which the output beams from these partial phase patterns are converged. In the optical tweezers according to the present invention, the partial phase patterns are prepared individually for each trapping position, and hence, by updating only the partial phase patterns belonging to the corresponding group, one trapping position can be moved independently of another trapping position. In other words, an object trapped in an optical trap formed in, and in the vicinity of, one trapping position can be moved independently of an object trapped in another trapping position. Therefore, in accordance with the optical tweezers, the freedom of the object trapping operation is increased.

The optical tweezers according to the present invention are also capable of moving at least one of the plural trapping positions three-dimensionally. Hence, in accordance with the optical tweezers, a trapped object can be moved three-dimensionally, and as a result, the freedom of the object trapping operation is increased. When a trapping position is moved three-dimensionally, the numerical aperture relative to the trapping position increases or decreases as the movement progresses. However, the trapping position described above has an increased numerical aperture, and therefore a sufficiently large numerical aperture can be maintained over comparatively long-distance movement so that the object remains trapped.

By superposing a phase pattern having a lens effect on each of the one or more partial phase patterns belonging to a group which corresponds to one of the plural trapping positions and updating the intensity of the lens effect, the phase pattern generating means can three-dimensionally move the trapping position in which the output beams from these partial phase patterns are converged. In accordance with this constitution, three-dimensional movement of a trapping position can be realized comparatively easily.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 6A and 6B are views for explaining point image formation using a CGH;

DETAILED DESCRIPTION OF THE PREFERRED EMBODIMENTS

Figure 1:
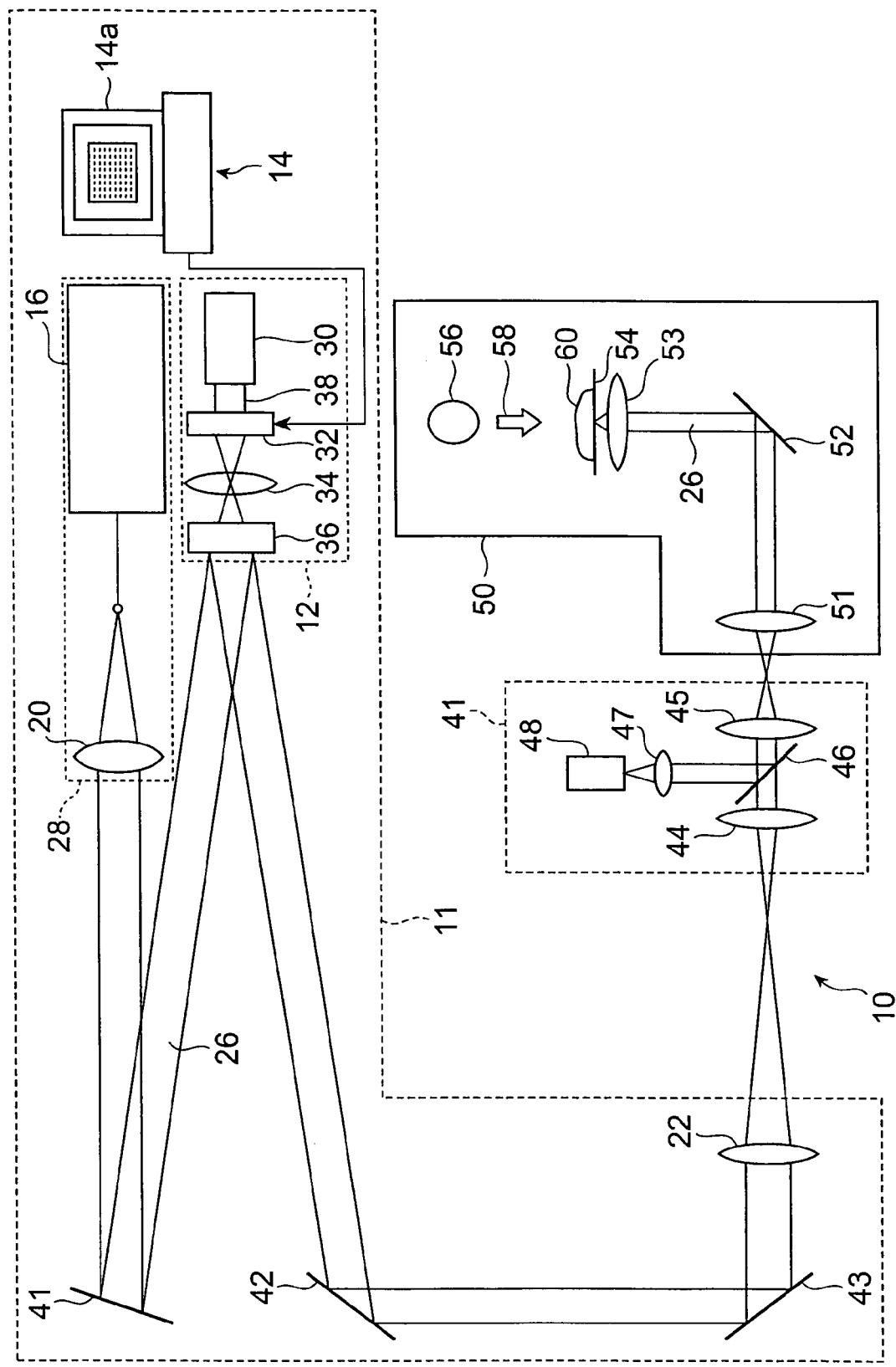
FIG. 1 is a schematic diagram of an embodiment of optical tweezers according to the present invention.

In the following, embodiments of optical tweezers according to the present invention will be explained in detail using FIGS. 1, 2A to 2B, 3 to 5, 6A to 7B, 8, and 9A to 9B. In the description of the drawings, identical or corresponding components are designated by the same reference numerals, and overlapping description is omitted.

First Embodiment

FIG. 1 is a schematic diagram of the optical tweezers according to the present invention. Optical tweezers 10 shown in FIG. 1 comprise an optical pattern forming apparatus 11, an imaging optical system 41, and a microscope 50. The optical tweezers 10 form an optical pattern using the optical pattern forming apparatus 11, and irradiate a sample 60 disposed in the microscope 50 with the optical pattern. The imaging optical system 41 captures an image of the optical pattern and the sample 60 in the microscope 50.

The optical pattern forming apparatus 11 comprises a spatial light modulator 12, a control system 14, a reading light source 16, a collimator lens 20, and a Fourier transform lens 22. A mirror 41 is disposed on an optical path between the collimator lens 20 and the spatial light modulator 12, and mirrors 42 and 43 are disposed on an optical path between the spatial light modulator 12 and the Fourier transform lens 22. The optical pattern forming apparatus 11 is capable of forming an arbitrary two-dimensional optical pattern. Note that in the first embodiment, particles in the sample 60 are trapped in plural positions, and hence an optical pattern including plural point images is formed.

The spatial light modulator 12 is an example of an electric address type phase modulation spatial light modulator known as a PPM (Programmable Phase Modulator). The spatial light modulator 12 comprises a writing light source 30, a transmission type LCD (Liquid Crystal Display) 32, an imaging lens 34, and a PAL-SLM (Parallel-Aligned Nematic Liquid Crystal Spatial Light Modulator) 36.

The writing light source 30 irradiates the LCD 32 with plane wave writing light 38 having a uniform two-dimensional intensity distribution. For example, the writing light source 30 is constituted by a laser element and a collimator lens for collimating a coherent laser beam emitted by the laser element. Note, however, that the writing light source 30 is not limited to a laser light source.

The LCD 32 displays an image corresponding to an electric image signal input from the control system 14. The LCD 32 transmits the writing light 38 and modulates the intensity distribution of the writing light 38 in accordance with the brightness distribution of the displayed image. In other words, the LCD 32 is an electric address type intensity modulation spatial light modulator which modulates the intensity of the writing light 38 in accordance with the pattern of the displayed image.

The imaging lens 34 forms an image of the intensity-modulated writing light 38 on the PAL-SLM 36. In other words, the writing light source 30 and imaging lens 34 project the image displayed on the LCD 32 onto the PAL-SLM 36.

The PAL-SLM 36 is an optical address type phase modulation spatial light modulator. The structure and actions of the PAL-SLM 36 are well-known, and will therefore be described only briefly here. Note that a detailed description of the PAL-SLM 36 is disclosed in International Publication Pamphlet No. 03/036368 (Document 3), for example.

The PAL-SLM 36 is optically addressed by the writing light 38, which is emitted onto a rear portion thereof, and subjects the phase of reading light 26 emitted onto a front portion thereof to spatial modulation. As a result, the reading light 26 is provided with a two-dimensional phase distribution which corresponds to the intensity distribution of the writing light 38. A photoconductive layer is provided on the rear portion of the PAL-SLM 36, and a liquid crystal layer is provided on the front portion. The liquid crystal layer and photoconductive layer are sandwiched by a pair of transparent electrodes, and a voltage is applied to the liquid crystal layer via these transparent electrodes. When the photoconductive layer is irradiated with the intensity-modulated writing light 38, a refractive index distribution which corresponds to the intensity distribution of the writing light 38 is formed on the liquid crystal layer. When the liquid crystal layer is irradiated with the reading light 26, the phase of the reading light 26 is modulated in accordance with the refractive index distribution. As a result, the reading light 26 is provided with a phase distribution which corresponds to the intensity distribution of the writing light 38. The PAL-SLM 36 is a reflection type phase modulator in which a mirror layer is provided between the liquid crystal layer and photoconductive layer. The phase-modulated reading light 26 is reflected by the mirror layer and output from the PAL-SLM 36.

The control system 14 creates a computer generated hologram (CGH) corresponding to the optical pattern to be formed. The CGH is constituted by data for controlling the phase modulation performed by the PAL-SLM 36, and expresses the two-dimensional distribution of the phase applied to the reading light 26, or in other words the phase pattern. In the first embodiment, a computer system installed with CGH creating software is used as the control system 14. The CGH may be calculated using an arbitrary method such as a simulated annealing method or a kinoform method. The control system 14 comprises a display apparatus 14$a$ for displaying the created CGH. The control system 14 supplies the LCD 32 with an image signal corresponding to the created CGH such that an image of the CGH is displayed on the LCD 32. Each pixel of the CGH image has a brightness (0 to 255) obtained from the phase modulation amount (0 to $2\pi$) in each pixel. The spatial light modulator 12 modulates the phase of the reading light 26 in accordance with the brightness distribution of the CGH image (output beam generation by the spatial light modulator 12).

The reading light source 16 and the collimator lens 20 constitute a light emitting apparatus 28 (light emitting means) for irradiating the spatial light modulator 12 with the reading light 26. In the first embodiment, the reading light source 16 is a laser element which generates a coherent, linearly polarized laser beam. Note, however, that the reading light source 16 is not limited to a laser light source. The laser beam emitted by the reading light source 16 is collimated by the collimator lens 20. As a result, the plane wave reading light 26 is generated. The reading light 26 is reflected by the mirror 41 and enters the PAL-SLM 36.

Note that in the first embodiment, the reading light source 16 is disposed such that the reading light 26 enters the liquid crystal layer in the PAL-SLM 36 as p-polarized light. However, when the entrance angle of the reading light 26 is small, the reading light source 16 may be disposed such that the reading light 26 enters the liquid crystal layer as s-polarized light.

The CGH image on the LCD 32 is projected onto the photoconductive layer in the PAL-SLM 36 by the imaging lens 34. The impedance of the photoconductive layer varies in accordance with the two-dimensional intensity distribution of the projected image, and hence the voltage that is applied to the liquid crystal layer has a distribution which corresponds to the intensity distribution of the CGH image. The angle of incline of the liquid crystal molecules is dependent on the applied voltage, and therefore as a result, a refractive index distribution which corresponds to the intensity distribution of the CGH image is formed on the liquid crystal layer. A two-dimensional phase distribution corresponding to this refractive index distribution is applied to the wavefront of the reading light 26 which passes through the liquid crystal layer. Having been subjected to phase modulation in this manner, the reading light 26 is reflected by the mirror layer disposed between the liquid crystal layer and photoconductive layer, and output from the PAL-SLM 36 toward the mirror 42. The mirror 42 reflects the phase-modulated reading light 26 toward the mirror 43, and the mirror 43 reflects the reading light 26 toward the Fourier transform lens 22.

The Fourier transform lens 22 Fourier-transforms the phase-modulated reading light 26 to form an optical image of the reading light 26. This optical image has an intensity distribution which corresponds to the phase distribution of the reading light 26. Thus, an optical pattern corresponding to the output CGH of the control system 14 is output from the optical pattern forming apparatus 11. The optical pattern is transferred into the microscope 50 via relay lenses 44, 45 inside the imaging optical system 41, and having passed through a relay lens 51, a mirror 52, and an objective lens 53 in sequence, the optical pattern enters the bottom surface of a sample table 54. A window (not shown) for transmitting the optical pattern is provided in the sample table 54, and the optical pattern passes through the window to form an image on top of the sample table 54. For focusing purposes, the distance between the objective lens 53 and the sample table 54 may be adjusted along the optical axis of the objective lens 53.

A sample 60 is placed on the upper surface of the sample table 54 using a preparation not shown in the drawing. The sample 60 is irradiated with white illumination light 58 emitted from an epi-illumination illumination apparatus 56 disposed above the sample table 54. An optical image of the sample 60 formed by this illumination is transmitted to the imaging optical system 41 via the objective lens 53, mirror 52, and relay lens 51. A beam splitter 46 is disposed between the relay lenses 44, 45 in the imaging optical system 41. The optical image of the sample 60 is transmitted to a CCD camera 48 via the relay lens 45, the beam splitter 46, and a relay lens 47, and captured by the CCD camera 48. An observer is able to observe the sample 60 by viewing the output image of the CCD camera 48. In the first embodiment, the output image is supplied to the display apparatus 14$a$ of the control system 14 and displayed on the display apparatus 14$a$.

In the first embodiment, point images are formed by converging output beams in each of plural positions on the sample 60, and a particle in the sample 60 is trapped in the convergence position of each point image using the optical force of the converged beams (an optical trap is formed in, and in the vicinity of, each output beam convergence position in which a point image is formed). By gradually varying the position of the point image by controlling the CGH input into the spatial light modulator 12, the trapped particle can be moved. The movement of the trapped particle may be one-dimensional, two-dimensional, or three-dimensional.

Figure 2A:
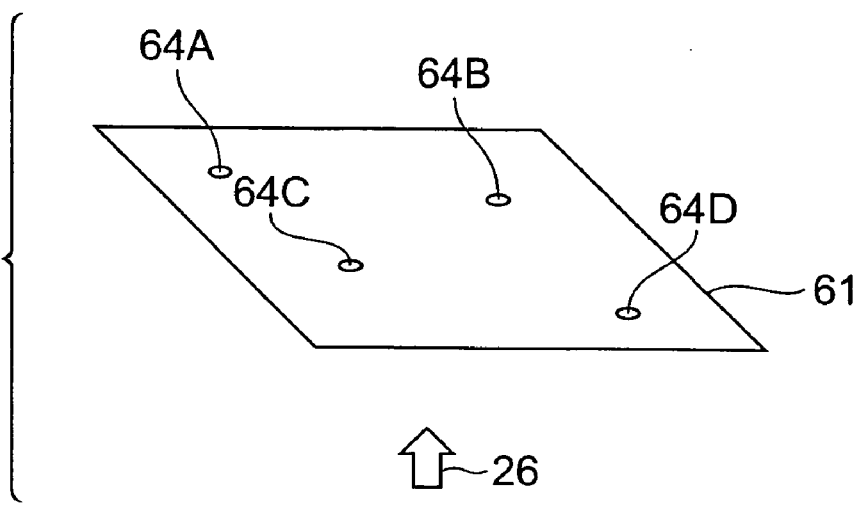
FIGS. 2A and 2B are views for explaining examples of point image arrays.
Figure 2B:
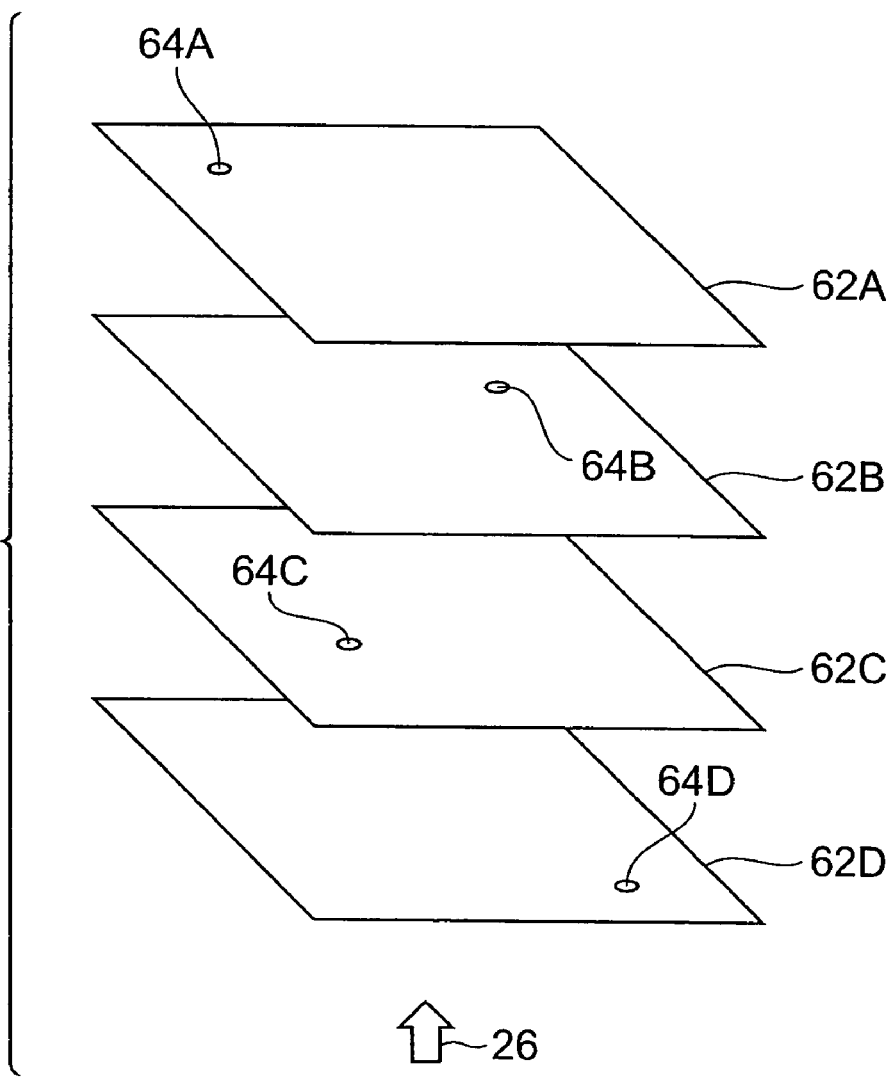

Plural point images may be disposed on a single plane or different planes. FIGS. 2A and 2B are views for explaining examples of point image arrays. In FIG. 2A, four point images 64A to 64D are disposed on a single convergence surface 61, while in FIG. 2B, the point images 64A to 64D are disposed on different convergence surfaces 62A to 62D.

A method of operating the control system 14 to trap a particle in the sample 60 will now be explained. The image of the sample 60 captured by the CCD camera 48 is displayed on the display apparatus 14$a$. When a particle in the sample 60 is trapped in a desired position, an operator operates an input apparatus of the control system 14 to specify a trapping position on the image of the sample 60. This specification may be performed by specifying the desired position on the image using a pointing device such as a mouse, or the coordinates of the trapping position may be input into the control system 14 using input means such as a keyboard. The control system 14 creates an output CGH for forming a point image in the specified position, and supplies the LCD 32 in the spatial light modulator 12 with an image signal corresponding to the output CGH. As a result, output beams subjected respectively to phase modulation in accordance with the brightness distribution of the output CGH image are generated from the reading light 26 which reaches the spatial light modulator 12, and a point image is formed in the specified position of the sample 60. When a particle exists in the vicinity of the point image, the particle is trapped in an optical trap formed by the optical force of the output beams forming the point image. In the case that a particle is to be trapped in another position, another trapping position is specified through a similar operation to the operation described above. In this manner, particles can be trapped in plural arbitrary positions.

Figure 3:
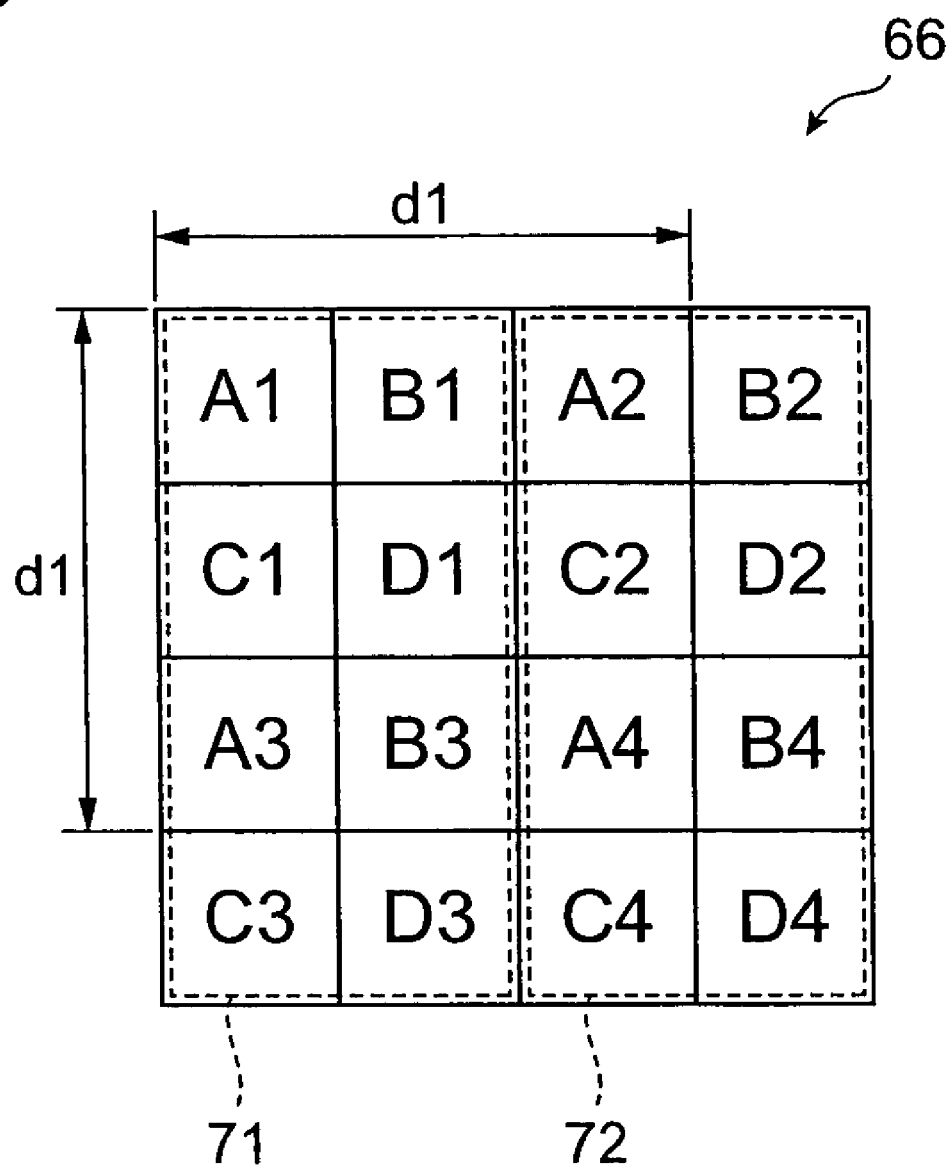
FIG. 3 is a plan view for explaining the constitution of a CGH used in a first embodiment.

In the first embodiment, an output CGH such as that shown in FIG. 3 is used to obtain the four point images 64A to 64D. This output CGH 66 has a square outline comprising 16 partial holograms arranged in matrix form. The outline of each partial hologram takes a square shape in which the length of one side is (⅓)×d1. In FIG. 3, identification labels A1 to A4, B1 to B4, C1 to C4, and D1 to D4 are attached to the partial holograms. The partial holograms A1 to A4 form the point image 64A, the partial holograms B1 to B4 form the point image 64B, the partial holograms C1 to C4 form the point image 64C, and the partial holograms D1 to D4 form the point image 64D.

Thus, a single point image is formed using four partial holograms disposed discretely and non-adjacently. The four partial holograms are divided between a first region 71 and a second region 72 obtained by partitioning the CGH 66 in two. For example, of the partial holograms used to form the point image 64A, A1 and A3 are disposed in the first region 71 while A2 and A4 are disposed in the second region 72. This rule applies similarly to the other point images. Hence, the four partial holograms for generating the output beams that are respectively converged in a single trapping position are each removed from the other three partial holograms. A partial hologram prepared in relation to another trapping position is disposed between the separated partial holograms.

The partial holograms are prepared independently for each point image (the plurality of prepared partial holograms are separated into groups such that one or more thereof corresponds to one of the point images), and therefore when only one point image is to be moved, only the partial holograms belonging to the group that corresponds to the point image need be updated, whereas the partial holograms belonging to the groups that correspond to the other point images do not need to be updated. Hence, in accordance with the optical tweezers 10, an operation to move a particle in the sample 60 which is trapped in an optical trap formed in a point image position can be performed quickly.

Figure 4:
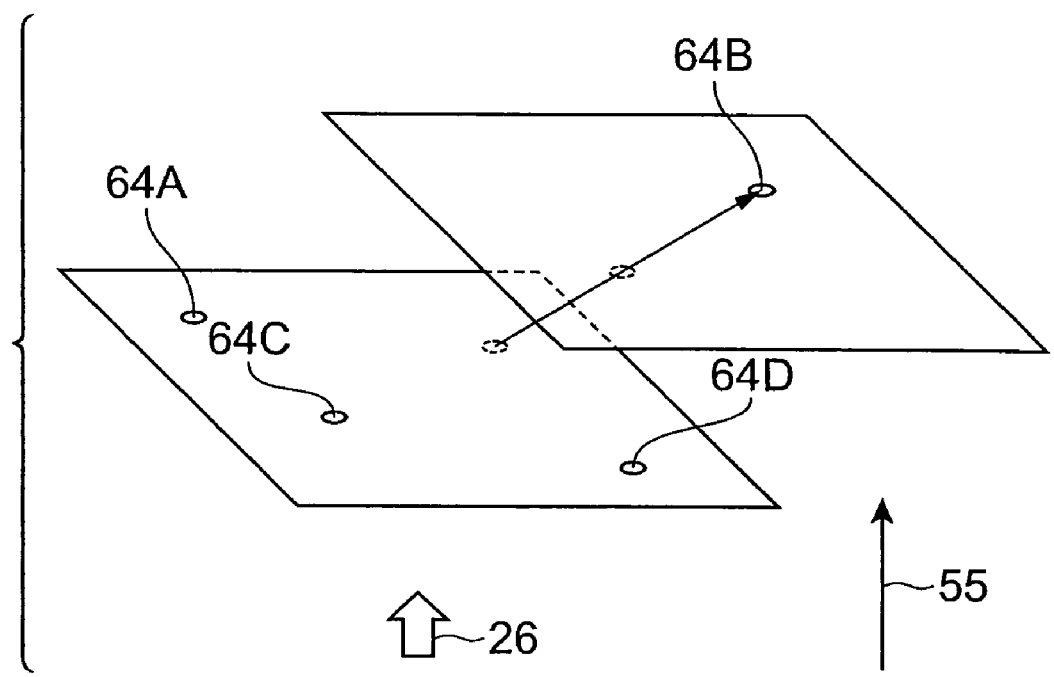
FIG. 4 is a view for explaining movement of one of four point images.

FIG. 4 is a view for explaining movement of the point image 64B as an example of the movement of a single point image. As described above, the point image 64B is formed by specifying a position on the display apparatus 14a, and to move the point image 64B, the trapping position, which has been specified via the input apparatus of the control system 14, is changed. When an end point of the trapping position to be moved is input into the control system 14, the control system 14 calculates a track from the current position to the end point. If the track is long, the control system 14 calculates one or more intermediate points positioned on the track and creates a CGH for forming a point image at the intermediate point. The intermediate point is then gradually brought closer to the end point by updating the CGH repeatedly such that finally, a point image is formed at the end point. The reason for this is that when a point image is moved over a long distance at one time, it is difficult to keep the particle trapped. On the other hand, when the track is sufficiently short, a CGH for forming a point image at the end point is created from the beginning, without calculating an intermediate point. Thus, the point image 64B and the particle trapped therein are moved to the end point.

As shown in FIG. 4, a point image may be moved three-dimensionally. This is realized by combining movement in an optical axis direction 55 of the objective lens 53 with two-dimensional movement in a perpendicular plane to the optical axis of the objective lens 53. More specifically, three-dimensional movement of a point image can be realized comparatively easily by adding a phase pattern having a lens effect to the one or more partial holograms for forming the point image to create the output CGH. By updating the intensity of the lens effect, the point image (the output beam convergence position in which the optical trap is formed) can be moved in the optical axis direction 55 of the objective lens 53. By exclusively modifying the lens effect of the phase pattern superposed on the partial holograms for forming a single point image, that point image alone can be moved in the optical axis direction 55.

Figure 5:
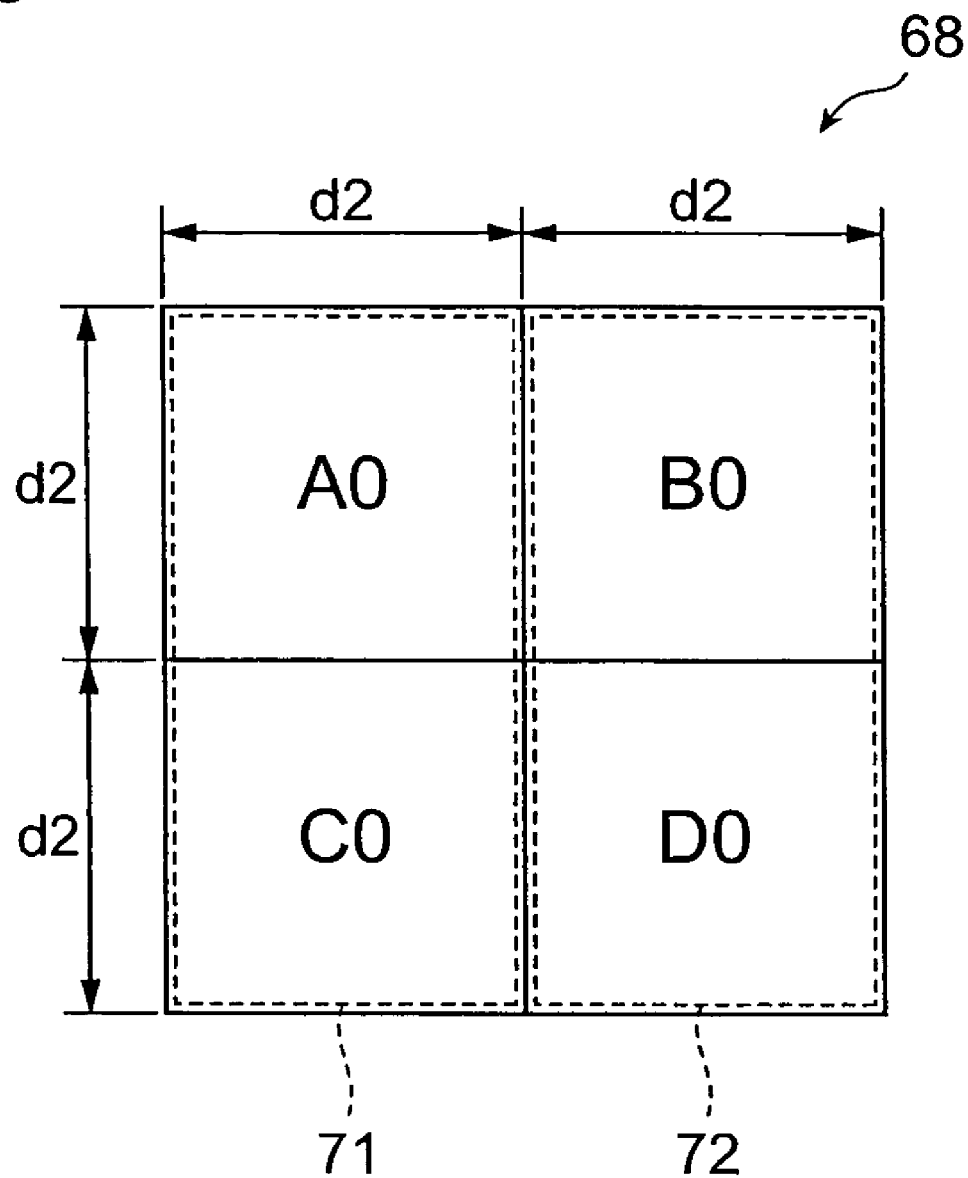
FIG. 5 is a plan view for explaining the constitution of a conventional CGH.

The advantages of the first embodiment will now be explained by comparing the first embodiment to the method described in the aforementioned Document 1. With the method described in Document 1, when the four point images 64A to 64D are formed, an output CGH such as that shown in FIG. 5 is used. This output CGH 68 has a square outline with identical dimensions to the CGH 66, and is constituted by four partial holograms A0, B0, C0, and D0 arranged in matrix form. The outline of each partial hologram takes a square shape in which the length of one side is d2. Here, d2 corresponds to two thirds of d1 in FIG. 3. The partial holograms A0, B0, C0, and D0 form the point images 64A, 64B, 64C, and 64D, respectively.

Hence, with the conventional method using the CGH 68 shown in FIG. 5, a single point image is formed using a single partial hologram. Therefore, in contrast to the CGH 66 used in the first embodiment, the partial hologram for forming a single point image is disposed in only one of the first region 71 and second region 72 obtained by partitioning the CGH 68 in two. Specifically, the partial holograms A0, C0 for forming the point images 64A, 64C are disposed in the first region 71 alone, while the partial holograms B0, D0 for forming the point images 64B, 64D are disposed in the second region 72 alone.

FIGS. 6A and 6B are views for explaining point image formation using a CGH. FIG. 6A illustrates point image formation using the CGH 66, while FIG. 6B illustrates conventional point image formation using the CGH 68. For simplicity, only the point images 64A and 64B are depicted in FIGS. 6A and 6B.

As shown in FIG. 6B, in conventional point image formation using the CGH 68, the point image 64A is formed by converging an output beam 77 modulated by the partial hologram A0, from the reading light 26 emitted by the objective lens 53. The numerical aperture of the output beam 77 corresponds to the surface area of the partial hologram A0, or in other words d2×d2. The numerical apertures of the output beams which converge at the other point images 64B to 64D are identical.

Next, FIG. 6A will be explained. As noted above, the partial holograms A1 to A4 of the CGH 66, which form the point image 64A, are divided between the first and second regions 71, 72 of the CGH 66. As a result, an output beam is emitted from the region corresponding to each partial hologram A1 to A4 on the lens surface of the objective lens 53, and these output beams are converged in a single point to form the point image 64A. Note that to simplify the drawing, only the output beams generated by the partial holograms A1, A2 are illustrated in FIG. 6A as 75$_1$, and 75$_2$, respectively.

The numerical aperture of the output beams converged at the point image 64A is determined in accordance with the distribution width on the lens surface of the objective lens 53 of the four output beams generated by the partial holograms A1 to A4. This distribution width corresponds to the distance d1 shown in FIG. 3. In conventional point image formation using the CGH 68, the partial hologram A0 forming the point image 64A only exists in the first region 71, and hence the distribution width of the partial hologram corresponds to the distance d2 shown in FIG. 5. Conversely, in the point image formation according to the first embodiment, using the CGH 66, the plural partial holograms A1 to A4 contribute to formation of the single point image 64A, and these partial holograms are removed from each other. The partial holograms A1 to A4 are distributed over the first region 71 and second region 72 of the CGH 66, and the distance d1 corresponding to the distribution width thereof is greater than d2. Hence, when the CGH 66 is used, a larger numerical aperture can be obtained in relation to the point image 64A than when the CGH 68 is used. Similarly, the other point images 64B to 64D are formed by the separated partial holograms B1 to B4, C1 to C4, and D1 to D4, and hence the output beam converged at each point image has a large numerical aperture. The force for trapping an object in a single point image becomes greater as the numerical aperture of the output beam converged at the point image increases, and therefore the optical tweezers 10 can exhibit a great trapping force in the point images 64A to 64D.

Further, by updating only the partial holograms corresponding to a single point image, the optical tweezers 10 can move the point image independently of the other point images. In other words, an object trapped in the vicinity of the point image can be moved independently of an object trapped in the vicinity of another point image. Hence, the optical tweezers 10 exhibit a high degree of freedom in the object trapping operation.

Moreover, the optical tweezers 10 can move a point image and an object trapped in the point image three-dimensionally. In this respect also, the optical tweezers 10 exhibit a high degree of freedom in the object trapping operation. When a point image is moved three-dimensionally, the numerical aperture relative to the point image increases or decreases as the movement progresses. However, by increasing the numerical aperture of the optical beam converged at the point image in the manner described above, the numerical aperture of the output beam can be kept sufficiently large over comparatively long-distance movement, and hence the object remains trapped.

Second Embodiment

In the following, a second embodiment of the optical tweezers according to the present invention will now be explained. The constitution of the optical tweezers according to the second embodiment is identical to the constitution shown in FIG. 1. In the second embodiment, the partial hologram array on the CGH differs from that of the first embodiment.

Figure 7A:
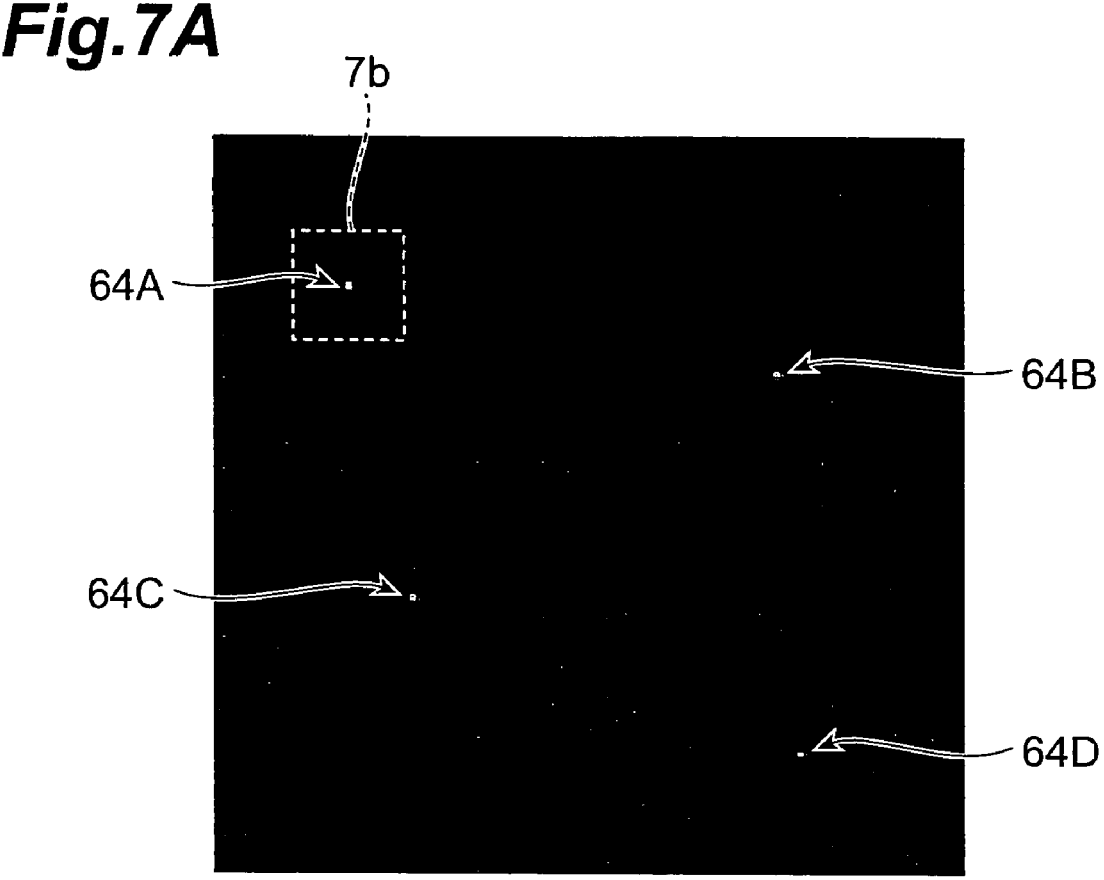
FIGS. 7A and 7B are photographs showing diffracted light generated around a point image.
Figure 7B:
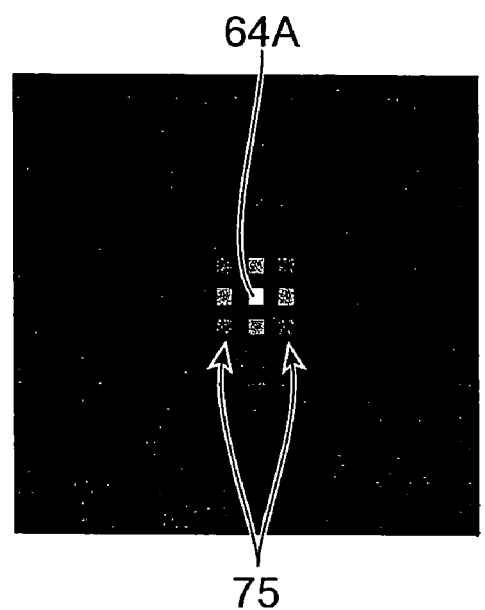

When the plural partial holograms for forming a single point image are arranged regularly, as in the first embodiment, surplus diffracted light is generated around the point image due to the regular array. FIGS. 7A and 7B are photographs for explaining the generation of diffracted light. FIG. 7A shows the point images 64A to 64D generated by the CGH 66, and FIG. 7B shows an enlargement of diffracted light 75 generated around the point image 64A. When the intensity of the diffracted light 75 is great, object trapping is performed by the diffracted light 75, possibly impeding object trapping in the position of the point image 64A. Hence, in the second embodiment, diffraction noise light is reduced by arranging the partial holograms for forming a single point image irregularly.

An example of an irregular array is an array in which the plural partial holograms for forming a single point image do not possess rotational symmetry of 180°/n (where n is an integer) about a certain point. Alternatively, when the plural partial holograms for forming the plural point images are arranged in matrix form, an array in which the plural partial holograms belonging to a group for forming a single point image do not form a square when connected by straight lines may be provided.

Figure 8:
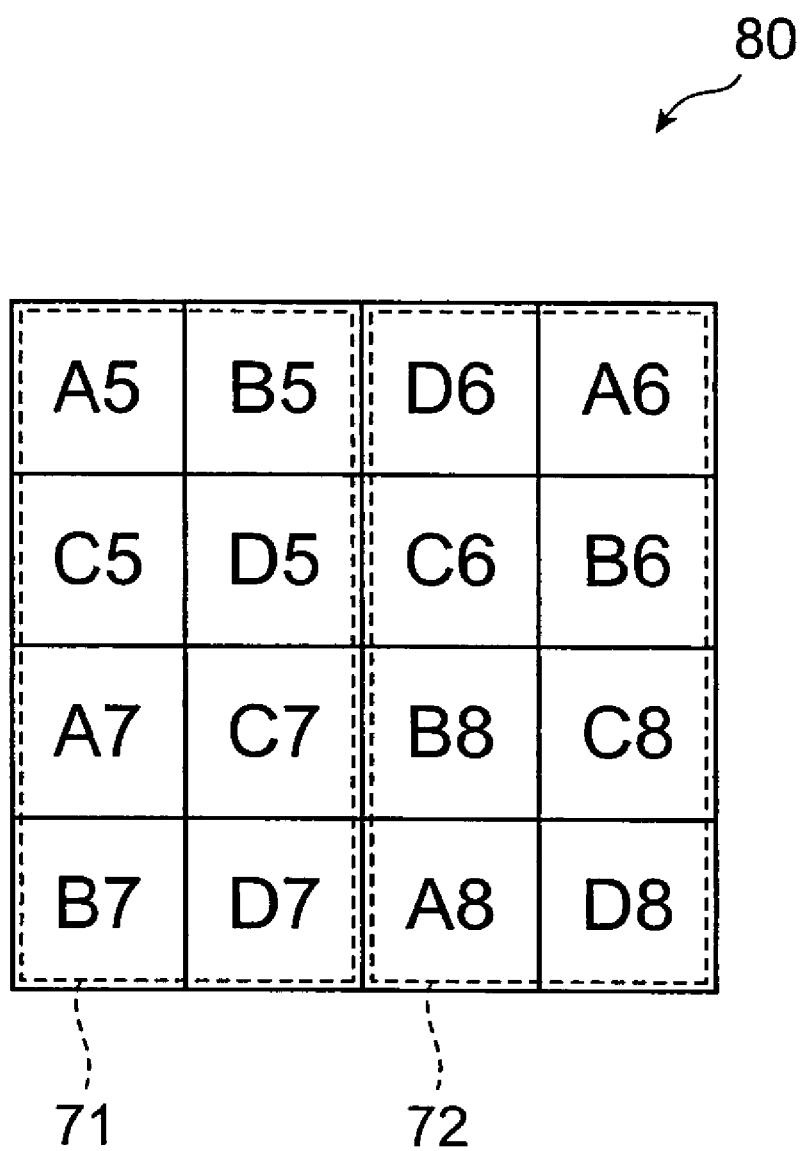
FIG. 8 is a plan view for explaining the constitution of a CGH used in a second embodiment.

FIG. 8 is a plan view for explaining the constitution of an output CGH used in the second embodiment. In FIG. 8, identification labels A5 to A8, B5 to B8, C5 to C8, and D5 to D8 are attached to the respective partial holograms. The partial holograms A5 to A8 form the point image 64A, the partial holograms B5 to B8 form the point image 64B, the partial holograms C5 to C8 form the point image 64C, and the partial holograms D5 to D8 form the point image 64D.

The partial holograms A5 to A8 are apart from each other, and hence a great trapping force is obtained in the point image 64A, as described in the first embodiment. Further, the partial hologram B5 is apart from B6 to B8, and hence a great trapping force is also obtained in the point image 64B. The partial hologram C5 is adjacent to C7, but is apart from C6 and C8. Hence, a great trapping force is also obtained in the point image 64C. Similarly, the partial hologram D5 is adjacent to D6, but is apart from D7 and D8, and therefore a great trapping force is also obtained in the point image 64D. An effect of increasing the trapping force is generally obtained as long as one of the plural partial holograms belonging to a group which corresponds to a single trapping position is apart from at least one of the other partial holograms belonging to the same group.

A CGH 80 differs from the CGH 66 used in the first embodiment in that the plural partial holograms forming the respective point images are arranged irregularly. As shown in FIG. 3, in the CGH 66, the partial holograms A1 to A4 forming the point image 64A are positioned at the four vertices of a square, and are therefore arranged in 90° rotational symmetry about the partial hologram D1. In the CGH 80, on the other hand, the intervals between the partial holograms A5 to A8 are non-identical in the vertical direction and horizontal direction, and the partial hologram A8 is disposed on a different column to the partial hologram A6 and a different row to the partial hologram A7. Therefore, the partial holograms A5 to A8 do not form a square when connected by straight lines, and the array of the partial holograms A5 to A8 does not possess rotational symmetry of 180°/n. In the CGH 80, the partial holograms forming the other point images 64B to 64D are also arranged irregularly.

Figure 9A:
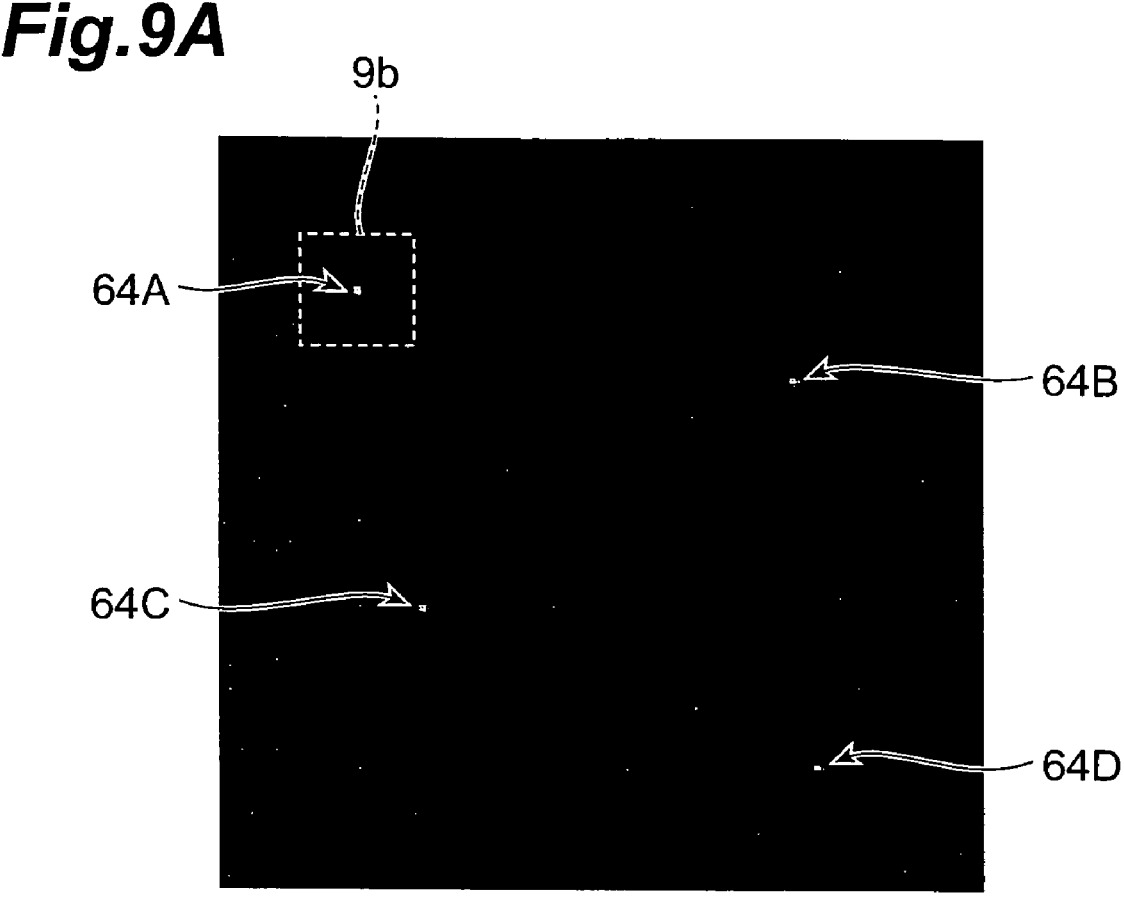
FIGS. 9A and 9B are photographs for explaining a reduction in diffracted light achieved through use of the CGH shown in FIG. 8.
Figure 9B:
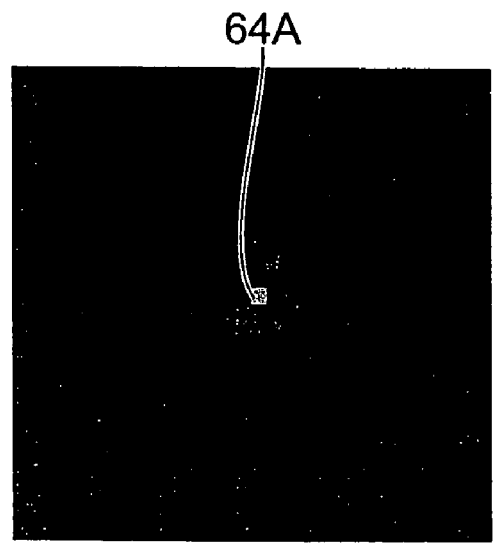

FIGS. 9A and 9B are photographs for explaining the reduction in diffracted light achieved by the CGH 80. FIG. 9A shows the point images 64A to 64D generated by the CGH 80, and FIG. 9B shows an enlargement of the periphery of the point image 64A. The point images 64A to 64D are arranged identically to the point images formed by the CGH 66. As is evident from a comparison of FIG. 7B and FIG. 9B, a reduction in the amount of diffracted light on the periphery of the point image 64A is achieved when the CGH 80 is used. The amount of diffracted light is reduced similarly around the other point images 64B to 64D. Hence, in the second embodiment, objects can be trapped reliably in the positions of the point images 64A to 64D.

Embodiments of the present invention were described in detail above, but the present invention is not limited to the embodiments described above, and may be subjected to various modifications within a scope which does not depart from the spirit thereof.

For example, the outlines of the plural partial holograms constituting the output CGH do not have to be uniform. The irregular array of the partial holograms is not limited to the array shown in FIG. 8, and any array may be employed as long as the array can reduce diffracted light.

In the embodiments described above, the control system 14 calculates the partial holograms and output CGH in response to a command from the operator, but pre-calculated partial holograms or a pre-calculated output CGH may be stored in a storage apparatus of the control system 14, and the partial holograms or output CGH may be read from the storage apparatus by the control system 14 in response to a command from the operator.

In accordance with the optical tweezers of the present invention, as described above, a great trapping force is obtained by increasing the numerical aperture of an output beam converged in a trapping position.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. Optical tweezers capable of forming an optical trap for trapping an object in each of plural trapping positions and the vicinity thereof by converging plural output beams in each of said trapping positions, comprising:

light emitting means for outputting a reading light;

phase pattern generating means for generating an output phase pattern by arranging plural partial phase patterns two-dimensionally after preparing said plural partial phase patterns divided into groups such that at least one of said partial phase patterns corresponds to each of said plural trapping positions, each of said partial phase patterns causing an output beam to converge in a corresponding trapping position; and a spatial light modulator for generating said plural output beams, each of which has been phase-modulated in accordance with said output phase pattern, from said reading light which reaches said spatial light modulator, wherein said phase pattern generating means generate said output phase pattern where said plural partial phase patterns are two-dimensionally arranged such that one partial phase pattern belonging to a group which corresponds to one of said plural trapping positions is apart from at least one of the other partial phase patterns belonging to said group.

2. The optical tweezers according to claim 1, wherein said phase pattern generating means generate said output phase pattern by disposing at least one partial phase pattern belonging to a group which corresponds to one of said plural trapping positions between two separated partial phase patterns of partial phase patterns belonging to a group which corresponds to another of said plural trapping positions.

3. The optical tweezers according to claim 1, wherein said phase pattern generating means generate said output phase pattern by irregularly arranging partial phase patterns belonging to a group which corresponds to one of said plural trapping positions.

4. The optical tweezers according to claim 1, wherein said phase pattern generating means generate said output phase pattern by arranging partial phase patterns belonging to a group which corresponds to one of said plural trapping positions such that said partial phase patterns do not possess rotational symmetry of $180°/n$ (where n is an integer).

5. The optical tweezers according to claim 1, further comprising a structure for updating only partial phase patterns belonging to a group which corresponds to one of said plural trapping positions in order to move only a trapping position in which output beams from said updated partial phase patterns are converged.

6. The optical tweezers according to claim 1, further comprising a structure for moving at least one of said plural trapping positions three-dimensionally.

7. The optical tweezers according to claim 1, wherein said phase pattern generating means superpose a phase pattern having a lens effect with respect to each of partial phase patterns belonging to a group which corresponds to one of said plural trapping positions, and three-dimensionally move a trapping position, in which output beams from said partial phase patterns are converged, by updating the intensity of said lens effect.

* * * * *